Oct. 31, 1961 J. BECKER 3,006,127
COMBINATION LAWN EDGER AND HEDGE TRIMMER
Filed Jan. 20, 1958
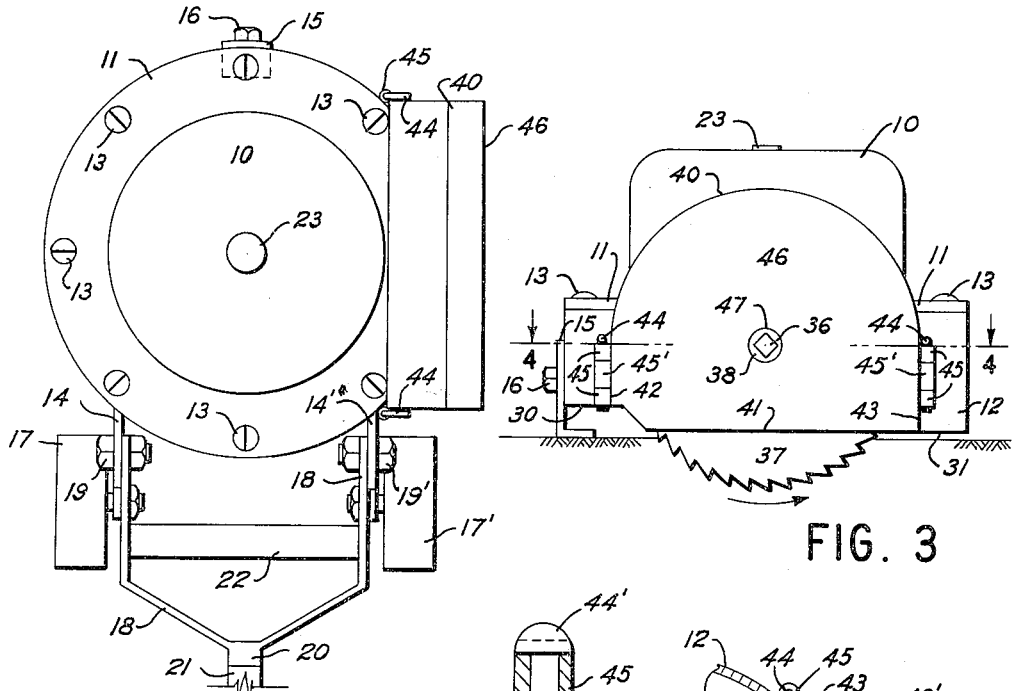
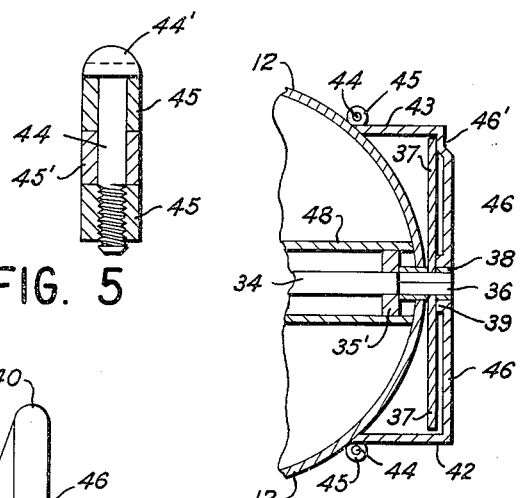
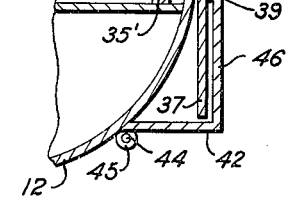
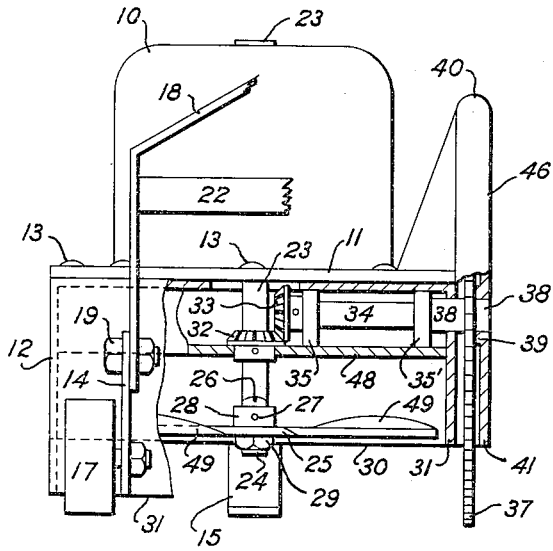
JACOB BECKER
INVENTOR.
BY Loyal H. McCarthy
ATTORNEY.

United States Patent Office 3,006,127
Patented Oct. 31, 1961

3,006,127
COMBINATION LAWN EDGER AND
HEDGE TRIMMER
Jacob Becker, 705 NE. 64th Ave., Portland, Oreg.
Filed Jan. 20, 1958, Ser. No. 709,876
2 Claims. (Cl. 56—25.4)

My invention relates to improvements in power tools having a combined usage of lawn edging and hedge trimming.

One of the objects of my invention is to provide a power tool which will trim the length of grass near the border of a lawn at the same time that it cuts off grass and sod which has run over the boundary of the lawn, such as along the edge of a walkway.

Another object of my invention is to provide a power tool for edging lawns which is simple, relatively inexpensive and capable of a dual or single edge trimming operation.

Another object of my invention is to provide a power tool employing a horizontal rotary cutter for trimming the height of grass near the border of lawn, driven by a means which also drives a vertically arranged sod trimming cutter.

A still further object of my invention is to provide a power tool which is capable of being quickly and easily converted from the dual function of trimming the height of grass and cutting overhanging sod at the border of a lawn to a tool which will perform only one of these operations at a time.

Still another and further object of my invention is to provide a power tool which may be readily adapted to trimming hedges.

Other and further objects of my invention will be apparent from the detailed specification, the claims and drawings set forth herein.

Referring to the drawings:

FIG. 1 is a top plan view of my combination lawn edger and hedge trimmer with the handle broken away.

FIG. 2 is an elevational view of my combination lawn edger and hedge trimmer with parts thereof broken away, showing the arrangement of the horizontal and vertical cutters and the driving mechanism therefor.

FIG. 3 is a side elevation view of my combination lawn edger and hedge tirmmer with the handle and wheels not being shown, the vertical cutter oppositely positioned to the showing FIGS. 1 and 2.

FIG. 4 is a fragmentary sectional view taken in the direction of the arrows along the line 4—4 of FIG. 3, showing the manner of mounting and retaining the vertical cutter on its driveshaft and its relation to its guard.

FIG. 5 is a sectional elevation view on an enlarged scale of another type of retaining pin arrangement for the vertical cutter guard.

Referring further to the drawings:

The motor housing 10 is provided with an integral flange 11 at its lower edge which in plan view conforms to the contours of the main housing 12. The motor housing 10 is secured to the main housing 12 by means of a plurality of cap screws or other suitable fastening means 13 so positioned in the flange 11 as to secure the main housing 12 thereto. Brackets 14 and 14' are secured by any suitable means to one side of the main housing 12 in spaced parallel relationship to each other. Diametrically opposite the midpoint between said brackets 14 and 14' a skid bar 15 is secured to the front side of the main housing 12 by any suitable locating means such as a bolt, or cap screw 16. Wheels 17 and 17' are rotatably attached to brackets 14 and 14', respectively, near their lower back edges. A substantially U shaped handle bracket 18 is pivotally secured to the brackets 14 and 14' by means of bolts, pins or rivets 19 and 19', respectively. A ferrule 20 is positioned midway of the closed portion of the handle bracket 18 and is adapted to receive and retain any suitable handle element 21 substantially at right angles to the pivotal attachment means 19 and 19'. A hand grip 22 is transversely positioned between the legs of the U-shaped handle bracket 18 near the closed edge thereof. The hand grip 22 may be constructed from any suitable materials.

The motor housing 10 encases any suitable type of motor, electric, gasoline, etc., in such a position that the driveshaft 23 thereof is substantially perpendicular to the ground when the device is resting upon its wheels 17—17' and its skid bar 16. The lower portion of the driveshaft 23 extends downwardly within the main housing 12 and is adapted at its lowermost end 24 to carry a horizontal rotary cutter 25. The end 24 of the driveshaft 23 is flattened as at 26 to provide a suitable bearing surface for securing means such as a set screw 27 threadedly mounted in the hub 28 of the rotary cutter 25. A lock nut, jam nut, or other suitable means 29 is threadedly positioned on the portion of the end 24 of the shaft 23 below the horizontal rotary cutter 25 and is adapted to further secure the cutter in the position set by the set screw 27. The rotary cutter 25 preferably will be slightly above the front lowermost edge 30 of the main housing 12 which edge 30 is positioned further from the ground than the side and rear edges 31 of the main housing 12. A bevel gear 32 is secured medially of the driveshaft 23 at a point below the flange 11 and the top of the main housing 12. A mating and cooperating bevel gear 33 meshes with the gear 32 at right angles thereto and is secured by any suitable means to the end of a transverse shaft 34. The shaft 34 extends at right angles to the shaft 23 through one side of the main housing 12 in such a manner as to be substantially parallel to the axis of the wheels 17 and 17', and the pivotal mounting means 19 and 19' for the handle bracket 18. The shaft 34 is carried by bearing blocks 35 and 35'; it is circular in cross section except for the portion of its outermost end 36 which projects beyond the bearing block 35'. The end 36 of the transverse shaft 34 is of polygonal or some other non-circular shape in cross section. A vertical cutter 37 is slidably fitted upon the end 36 of the transverse shaft 34 by means of a hub 38 whose outer peripheral contour is circular on both sides of cutters 37. The central opening through the hub 38 is complementary to and of the same cross sectional shape as the end 36 of the transverse shaft 34 and is slidably fittable upon said end 36. The finished hub 38 is an integral unit with vertical cutter 37, though initially it and the said cutter may be made up from several separate pieces. The hub 38 is so proportioned that it bears against the side of the bearing block 35' when the vertical cutter 37 is in its operating position upon the transverse shaft 34. Adjacent to the outer side of the vertical cutter 37 a slight shoulder 39, integral with a vertical cutter guard 40, is positioned around the outer portion of the hub 38.

The guard 40 for the vertical cutter 37 is shaped at its lower edge 41 to conform to the contours of the lower edges 30 and 31 of the main housing 12. The guard 40 is removably attached to the side of the main housing 12 at its edges 42 and 43 by any suitable means such as retaining pins 44 inserted through interlocking lugs or shoulders 45 and 45'. Either of the lugs 45 or 45' may be secured to the main housing 12 so long as its interlocking component is secured to the edges 42 or 43 of the vertical cutter guard 40. If desired, threads may be provided in the lower one of the lugs 45, and 44 may be a complementary threaded cap screw or bolt, having any suitably shaped head driving means, such as 44'. The side 46 of the vertical cutter guard 40 is formed and indented so as to contact and scrape against the sides of the cutting edges of the vertical cutter 37 near the end 43 of the guard 40 at approximately the point 46' thereof. At this point the cutter 37 will be traveling upwardly out of the sod and by scraping along the side 46 of the guard 40 at the point 46' will tend to clean itself of any fouling or debris that may be lodged in the teeth thereof during the sod-cutting operation. A hole 47 through the side 46 of the cutter guard 40 is so dimensioned as to snugly but rotatably retain the outer end of hub 38 of the vertical cutter 37. The relatively long inner end of the hub 38 is likewise retained snugly but rotatably in a hole through the side of the main housing 12. When the vertical cutter guard 40 is thus secured in position on the main housing 12 the vertical cutter is positively, snugly and driveably retained in place on the non-circular end 36 of the transverse shaft 34, the shoulder 39 providing a bearing surface between the side 46 of the guard 40 and the vertical cutter 37. Likewise the bearing blocks 35 and 35' respectively, will provide end thrust bearing surfaces for the hub of the bevel gear 33 and the inner end of the hub 38 of the vertical cutter 37.

A shield member 48 is formed to a U-shaped, or other suitable, cross section and is secured to and transversely of the main housing 12 across its diameter in such a manner that it will encase the bevel gears 32 and 33, the transverse shaft 34 and the bearing blocks 35 and 35'.

The back edges 49 of the horizontal rotary cutter 25 may be inclined slightly upward if desired for the purpose of directing a stream of cool air against the lower end of the motor and its housing 10. This will facilitate cooler running of the motor when my device is being used over extended periods of time.

It is apparent from the structure disclosed herein that either the vertical cutter 37 or the horizontal rotary cutter 25 may be easily and readily removed from the device without hindering the operation of the other cutter. This feature enables using my invention either as a grass-cutting and sod-removing edge, or as a sod-removing edger alone or as a grass-trimming edge alone. Also, by removing the vertical cutter 37 and the handle element 21, the device, being relatively light, may be picked up and retained by the transverse handle element 22 and the motor housing 10 for use in trimming the sides and top surfaces of hedges.

It is apparent that the disclosure set forth herein is merely a preferred embodiment of my invention and that variations therefrom are feasible without departing from the spirit of my invention. It is, therefore, to be understood that I am not limiting myself to this specific disclosure.

Having thus described my invention, I claim:

1. In a rotary grass cutter and sod trimmer: a main housing; a motor housing detachably mounted on the top of said main housing; a motor carried by said motor housing, said motor having a vertical drive shaft extending downwardly through said main housing, the lower end of said drive shaft being flattened on one side and threaded; a horizontal rotary cutter demountably and adjustably secured on said flattened and threaded lower end of said vertical drive shaft; a skid bar secured to the front of said main housing and depending to a point below said rotary cutter; two wheels spaced in a diametrically opposite relation mounted on said main housing rearwardly from said skid bar; a bevel gear secured on the said vertical drive shaft intermediately of said motor and said rotary cutter; a horizontal shaft rotatably mounted at right angles to said vertical drive shaft, said horizontal shaft extending outwardly from said vertical shaft through one side of said main housing and having a polyhedronal outer end; a bevel gear secured to the inner end of said horizontal shaft, said bevel gear meshing with and being driven by said bevel gear on said vertical drive shaft; a circular vertical edger blade, having teeth around its outer peripheral edge and being detachably mounted on said polyhedronal outer end of said horizontal rotatable shaft, said edger blade being provided with a circular hub concentrically thereof, said circular hub having therethrough a polyhedronal opening complementary to said polyhedronal outer end of said horizontal shaft; an hollow cutter guard open at its lowermost edge and demountably attached to the side of said main housing through which said horizontal shaft extends, encasing said vertical edger blade downwardly to a point in line with the lowermost edge of said main housing, said cutter guard being indented inwardly at one edge of its outer surface, said indentation contacting the outer side surface of the teeth of said vertical edger blade, thereby cleaning said teeth; the said outer side surface of said hollow cutter guard provided with a circular opening therethrough, said opening being complementary to and engageable upon the outer peripheral surface of the outer end of said circular hub of said vertical edger, retaining said vertical edger blade in engagement with said outer polyhedronal end of said horizontal shaft.

2. In a rotary grass cutter and sod trimmer consisting of a main housing; a motor housing detachably mounted on the top of said main housing; a motor carried by said motor housing, said motor having a vertical drive shaft extending downwardly through said main housing, the lower end of said drive shaft being flattened on one side and threaded; a horizontal rotary cutter demountably and adjustably secured on said flattened and threaded lower end of said vertical drive shaft; a skid bar secured to the front of said main housing and depending to a point below said rotary cutter; two wheels spaced in a diametrically opposite relation mounted on said main housing rearwardly from said skid bar; a bevel gear secured on the said vertical drive shaft intermediately of said motor and said rotary cutter; a horizontal shaft rotatably mounted at right angles to said vertical drive shaft, said horizontal shaft extending outwardly from said vertical shaft through one side of said main housing and having a polyhedronal outer end; and a bevel gear secured to the inner end of said horizontal shaft, said bevel gear meshing with and being driven by said bevel gear on said vertical drive shaft: a circular vertical edger blade, having teeth around its outer peripheral edge and being detachably mounted on said polyhedronal outer end of said horizontal rotatable shaft, said edger blade being provided with a circular hub concentrically thereof, said circular hub having therethrough a polyhedronal opening complementary to said polyhedronal outer end of said horizontal shaft; and an hollow cutter guard open at its lowermost edge and demountably attached to the side of said main housing through which said horizontal shaft extends, encasing said vertical edger blade downwardly to a point in line with the lowermost edge of said main housing, said cutter guard being indented inwardly at one edge of its outer surface, said indentation contacting the outer side surface of the teeth of said vertical edger blade, thereby cleaning said teeth, the said outer side surface of said hollow cutter guard provided with a circular opening therethrough, said opening being complementary to and engageable upon the outer peripheral surface of the outer end of said circular hub of said vertical edger, retaining said vertical edger blade in engagement with said outer polyhedronal end of said horizontal shaft.

References Cited in the file of this patent

UNITED STATES PATENTS

| | | |
|---|---|---|
| 657,411 | Hamm | Sept. 4, 1900 |
| 1,797,028 | Snyder | Mar. 17, 1931 |
| 2,521,033 | Bell | Sept. 5, 1950 |
| 2,707,858 | Norton et al. | May 10, 1955 |
| 2,751,028 | Laughlin | June 19, 1956 |
| 2,836,024 | Davis et al. | May 27, 1958 |
| 2,857,728 | Smith et al. | Oct. 28, 1958 |